Feb. 28, 1950
J. DYSON
2,499,182
AUTOMATIC MAXIMIZING CONTROL SYSTEM
Filed June 14, 1947
2 Sheets-Sheet 1
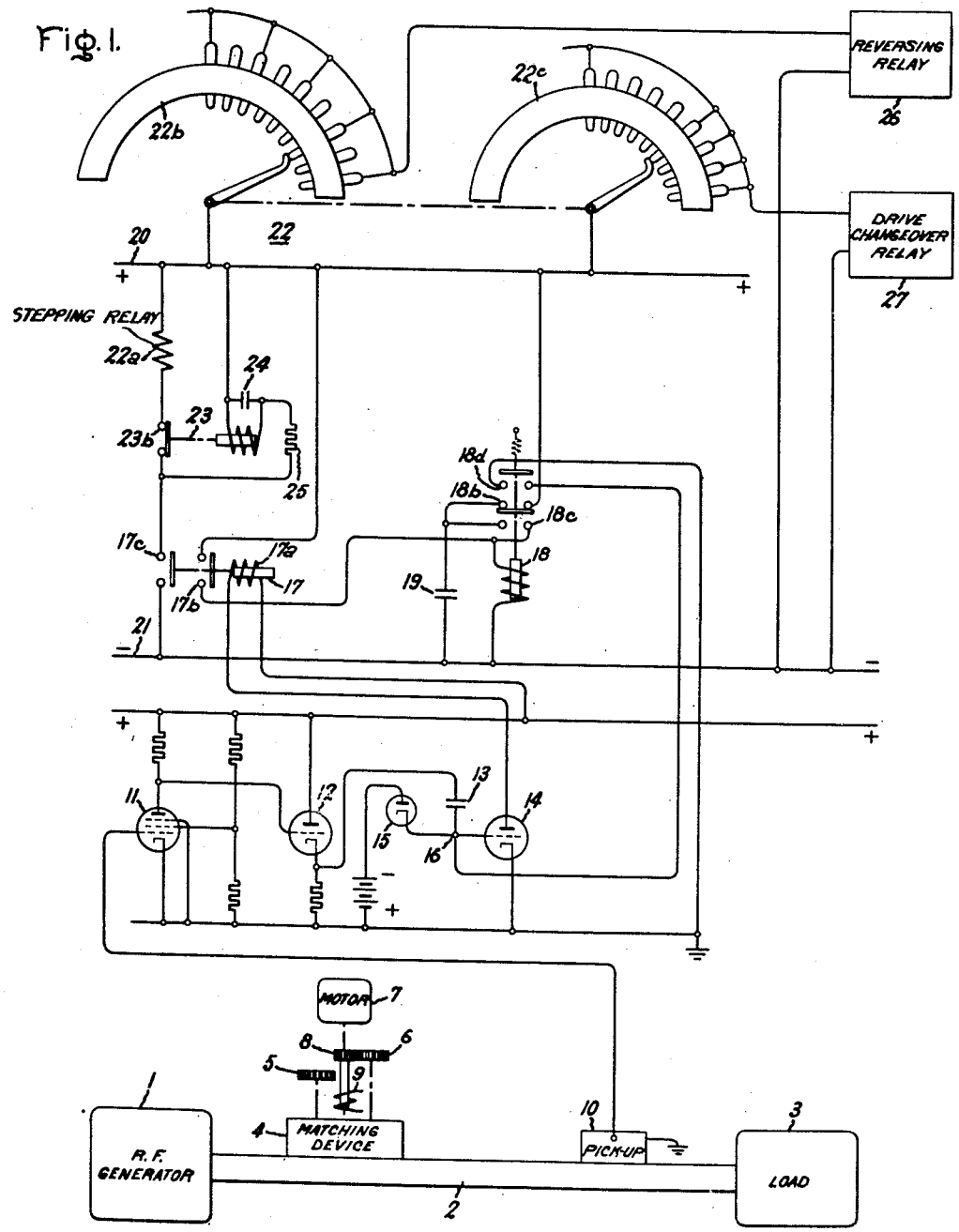
Inventor:
James Dyson,
by Claude A. Mott
His Attorney.

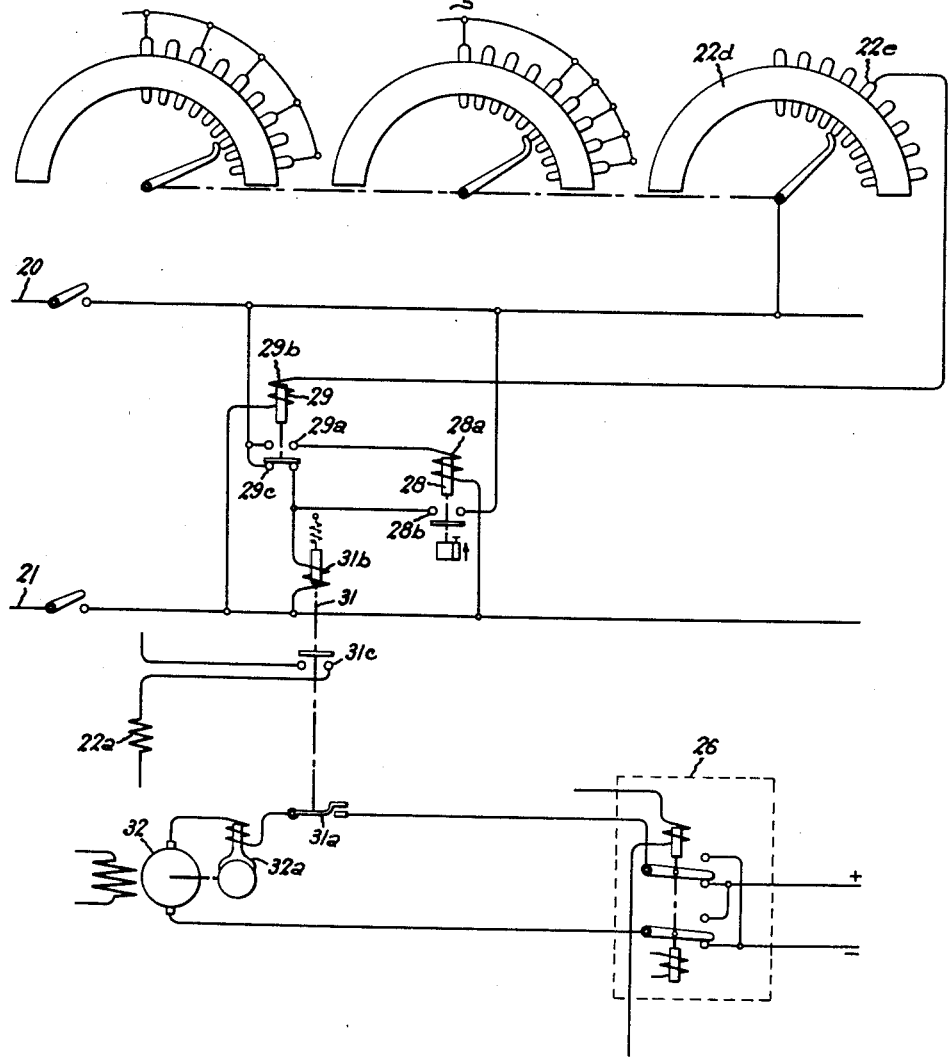

Patented Feb. 28, 1950

2,499,182

UNITED STATES PATENT OFFICE 2,499,182

AUTOMATIC MAXIMIZING CONTROL SYSTEM

James Dyson, Rugby, England, assignor to General Electric Company, a corporation of New York Application June 14, 1947, Serial No. 754,763
In Great Britain October 8, 1946

5 Claims. (Cl. 323—2)

This invention relates to electric control circuits capable of automatically operating to maintain a quantity at a desired value.

Cases arise wherein a quantity to be controlled is dependent upon two variables both of which require adjustment, in the event of a change in the value of the quantity, to restore the quantity to a desired value.

It is the object of the present invention to provide an automatic control system which will enable this to be effected.

In accordance with the invention a measure of the quantity to be controlled is obtained, control means is provided whereby, in response to a change in the quantity, there is effected an adjustment in one of the variables, whereby to offset the change in the quantity to be controlled and tend to restore it to a desired value, the control means being so operated that adjustment of both of the variables takes place alternately.

The invention is particularly intended for use in the case in which a quantity to be controlled is to be maintained at a maximum value, the maximum being obtained only when both of said variables are properly adjusted.

In carrying out the invention in connection with such a system the arrangement is such that the adjustment of one of the variables is effected so that the value of the quantity is caused to hunt about the maximum value for a predetermined number of adjustments, the control is then transferred to the other variable which is then adjusted for a predetermined number of operations in a similar manner, and the control is then restored to the first variable.

The control means may include a reversible motor which effects the adjustment of an element which in turn controls the variable, the adjustment of the element being effected first in one direction and then the other by continued reversals of the motor. The control is then transferred to a similar reversible motor which effects the control of the other variable in a corresponding manner. It is preferred to use a single reversible motor and to transfer its control from one to the other element, whereby to adjust the two variables in succession after a predetermined number of motor reversals. In the event that the initial direction of rotation of the motor is such as to control the variable so as to reduce the quantity when an increase is required, the resulting diminution of the quantity, as indicated by the means employed to obtain a measure thereof is caused to effect the reversal of the motor automatically.

The invention thus further comprises an arrangement for bringing to a maximum value any quantity dependent upon two variables consisting of means adapted to obtain a measure of the quantity, means for obtaining a current or voltage indicative as to whether the quantity is increasing towards, or diminishing from, the maximum, means for making an arbitrary change in one of the variables, and means for continuing or reversing said change operative by said current or voltage in such a manner that if the quantity is increasing the change is continued, whereas if it is decreasing the change is reversed, and means for changing over from the control of one variable to the other after a predetermined number of such reversals.

One application of the invention is in connection with the supply of radio frequency power from a generator to a load of which the impedance may be variable, and it is desired to match the impedance of the load to that of the generator so that maximum available power is transmitted to the load. This matching requires a control of two variables corresponding to inductance and capacity and, in the case where the power is transmitted through a wave guide to the load, the matching device may contain two elements, for example, a probe of adjustable depth and a quarter wave section of adjustable impedance. By adjustment of these two elements we may transform any given load impedance into a required impedance, as seen by the generator.

For the purpose of enabling the nature of the invention to be more readily understood, we will now describe, with reference to the accompanying drawing, an arrangement intended for effecting the automatic matching of a load to an R. F. generator supplying the load. It will be understood, however, that the invention has general application to the maximizing of quantities or functions which are dependent upon two variables.

Referring to the drawing, we have indicated at 1 a source of R. F. power connected through a wave guide 2 to a load 3, the impedance of which is subject to variation with time. The matching of the load 3 to the generator 1 is effected by means of a matching device 4 comprising two elements, one of which may be a quarter wave section of adjustable impedance, and the other a probe of adjustable depth. Such matching devices are well known, and since the structure of the matching device per se constitutes no part of the present invention, it is illustrated conventionally in the drawing. These two elements, i. e. the probe and the impedance, are each adjusted by a mechanical device such as a cam driven by corresponding shafts, one carrying a gear wheel 5 and the other a gear wheel 6. A motor 7 is provided having on its shaft a pinion 8 which is adapted to mesh alternately with the gear wheels 5 and 6; the transfer of control from one to the other being effected by a drive changeover, indicated diagrammatically as a solenoid 9.

Between the matching device 4 and the load 3 is a pick-up device 10 which gives a voltage which varies with the power transmitted down the line. This may preferably consist of a diode or crystal detector, operating in an auxiliary transmission line so coupled to the main line, in a known manner, as to respond preferably only to the wave traveling from source to load, and not to the wave reflected from the load. This is not absolutely essential, but it ensures that the range of voltages delivered by the detector will be a minimum for the range of load impedance met with in practice.

The output from the pick-up 10 (supposed negative in sign) is amplified by a valve, preferably of the pentode type, 11, the output of which is converted to a low impedance by the cathode-follower valve 12. The output of this is taken by means of a condenser 13 to the grid of a triode 14 and the cathode of a diode 15. The anode of valve 15 is taken to earth through a battery or other low-impedance device which makes the anode about three volts negative to earth.

In the absence of any variation of the input voltage, the potential of the point 16 adjusts itself so that current flows neither through valve 15 nor through the grid of valve 14, i. e., the point 16 becomes about 1½ volts negative to earth. If the input voltage becomes more negative, i. e., if the R. F. level in the transmission line increases, the point 16 moves in the positive direction until grid current flows in valve 14; thereafter it cannot become more positive, as the grid current maintains it within a fraction of a volt of ground potential. If the input voltage becomes less negative, i. e., if the R. F. level decreases, the point 16 will move in the negative direction till valve 15 becomes conducting, and will then stay at this potential (about 2 volts negative to ground) as long as the R. F. level is decreasing. However, the grid of valve 14 will also move in the negative direction with point 16, so that the anode current of valve 14 will fall. In the anode circuit of valve 14 is the coil 17a of a relay 17, which is adjusted so that it is energized when point 16 moves in the positive direction and de-energized when it moves in the negative direction.

When relay 17 is de-energized, its contacts 17b are closed and complete a circuit to energize the coil 18a of a relay 18. A condenser 19 is connected through its normally-closed contacts 18b to the positive side of the D. C. relay operating supply, which is represented by the conductors 20 and 21, so that it is charged to the full voltage. When relay 18 is energized, condenser 19 is disconnected from the supply and connected, through the normally-open contacts 18c in parallel with the relay coil. Thus, even if the relay 17 is energized and opens its contacts 17b immediately after energizing relay 18, relay 18 remains closed for a time sufficient for the condenser 19 to discharge through the relay coil. This time is made about one-half second.

Further, normally-open contacts 18d on relay 18 connect the grid of valve 14 to ground when relay 18 is energized. Thus, if the R. F. level decreases, causing point 16 to become more negative, the anode current of valve 14 falls and relay 17 is de-energized. Relay 18 is then energized and shorts the grid of valve 14 to earth. The anode current of valve 14 therefore rises and relay 17 is again energized. Relay 18 remains closed for one-half second, however, due to the condenser 19, and during this time the effects of further changes in R. F. level cannot cause further relay operations, as the point 16 is shorted to earth. Finally, relay 18 opens again and the system is ready to respond to further changes.

A further normally-closed pair of contacts 17c on relay 17 close the circuit through the coil 22a of a selector type of relay 22 via the normally closed contacts 23b of a relay 23 when relay 17 is de-energized. The operating coil of relay 23 is energized at the same time, operation of relay 23 being retarded by condenser 24 and resistance 25. Thus, when relay 17 is de-energized, relay winding 22a is energized; a fraction of a second later relay 23 operates, opening contacts 23b and breaking the circuit through coil 22a. The relay 22 is of the well-known selector type, and is provided with two banks of contacts 22b and 22c. Bank 22b controls the reversal of the motor 7 which actuates the two elements of the impedance matching device. The function of the second bank of contacts 22c is to provide for the changeover of control from one element of the matching device to the other.

The energization of winding 22a causes the relay 22 to move its contact arms round one step. Relay 23 then remains energized with its contacts 23b open so long as relay 17 is de-energized. The banks of the selector relay consist of 24 contacts each (or any other multiple of 8). The first, third, fifth etc., contacts of bank 22b are connected together and arranged so that when the contact arms is on the corresponding stud a reversing relay 26 is energized and the motor 7 controlling the matching device runs in one direction; when it is on any of the intervening studs, relay 26 is de-energized and the motor runs in the opposite direction. Thus, the motor reverses every time relay 17 is de-energized, i. e., when the R. F. power is decreasing. This is what is required, as a decrease of R. F. power indicates that the matching device is being operated in the wrong direction.

If, when the system is first energized, the first motion of one element of the matching device is in the wrong direction, the R. F. level begins to decrease, relay 17 is de-energized and notches relay 22 on one notch. The motor then reverses and the R. F. power begins to increase.

It is evident that if the motor does not reverse sufficiently rapidly, it might overrun and cause a second operation of relay 17 before it is reversed, in which case it would not reverse at all. The half-second delay on the opening of relay 18 prevents this, for the grid of valve 14 is earthed for a period sufficient for the motor to reverse. The motor having reversed, it runs until the R. F. power reaches a maximum and begins to decrease, when the motor reverses again and runs back over the maximum. Having crossed it a second time, it reverses again and crosses it a third time, and reverses again.

After a predetermined number of such reversals, the second bank of contacts 22c comes into play. These are connected in alternate groups of 4; Nos. 1, 2, 3, 4 and 9, 10, 11, 12, and so forth, are connected together, and arranged so that the coil of a drive changeover relay 27 is energized when the contact arm is on one of these contacts. The result is that the drive is changed over from one element of the matching device to the other every fourth operation of relay 17. Thus, having brought the R. F. power to a maximum on the first element, the system then brings it to a maximum on the second element, then changes back to the first and repeats the operation.

After a few operations the R. F. power is thus brought to the maximum available level, if the choice of elements for the matching device has been wise. The two elements described above (probe and quarter-wave section) allow this to be done. When the maximum has been attained, the device continues to run and "hunts" about the maximum, its greatest departure therefrom being a small quantity depending on the sensitivity of the circuit, and which can be made a very few per cent of the maximum.

If for some reason the impedance of the load alters say by reason of temperature change, the position of the maximum will alter, but the system will then re-set the two matching elements to the required new position, on matter how slow the change may have been.

To avoid unnecessary wear on the system, it is desirable to provide a further bank of contacts 22d on the selector relay as illustrated in the modification of Fig. 2. One of these contacts is connected to a relay 29, in such a position that when the contact arm reaches the contact in question, the motor is switched off and a brake applied to prevent overrun. Alternatively, a clutch may be used to disconnect the motor.

In the modification of Fig. 2, parts corresponding to identical parts in the modification of Fig. 1 are designated by the same reference characters. The operating coil 28a of a time delay relay 28 is connected across the supply source 20, 21 through the normally open contacts 29a of a control relay 29. The time delay relay 28 is provided with a pair of normally open contacts 28b which close at the expiration of a predetermined interval after the energization of the operating coil 28a. One terminal of the operating coil 29b of relay 29 is connected to conductor 21 and the opposite terminal is connected through conductor 30 to the contact 22e on a third bank 22d of the selector switch.

A second control relay 31 having normally open contacts 31a in the armature circuit of the motor 32 is provided for disconnecting the motor from the line for predetermined intervals of time in response to operation of the time delay relay. This relay 31 has an operating coil 31b which is connected to the line through the normally closed contacts 29c of control relay 29. It is also provided with a pair of normally open contacts 31c in circuit with the operating coil 22a of the selector switch.

The operation is as follows: When the rotary contact of the bank 22d of the selector switch is stepped into contact with the stationary contact 22e, an energizing circuit is completed for the operating coil 29b of the control relay which is traced from the supply conductor 20 through the rotary contact of the selector switch, stationary contact 22e, conductor 30, and operating coil 29b to the supply conductor 21. In response to energization, relay 29 closes its normally open contacts 29a to complete an energizing circuit for the operating coil 28 of the time delay relay. Simultaneously, relay 29 opens its normally closed contacts 29c, thereby interrupting the energizing circuit for the operating coil 31b of control relay 31. In response to de-energization, relay 31 opens its normally open contacts 31a to disconnect the motor 32 from the source which simultaneously opens its normally open contacts 31c to interrupt the energizing circuit for the operating coil 22a of the selector switch. The system is now de-energized and no further maximizing operations can take place until it is re-energized.

After a predetermined interval of time, e. g. 10 seconds, the time delay relay closes its normally open contacts 28b, thereby completing an energizing circuit for the operating coil 31b, which in response to energization closes its normally open contacts 31a and 31c. Contacts 31a in closing reconnect the motor 32 to the source, and contacts 31c in closing recomplete the energizing circuit for the operating coil 22a of the selector switch, and the selector relay stepped round to the next contact. Thus, after two or three complete cycles of operations, during which a maximum should have been found, the system is quiescent for a period. It then starts again and if a change in the load has occurred during the quiescent period, it immediately makes the necessary adjustment. For loads which vary only slowly, or not at all, this will prevent unnecessary wear on gearing and relay contacts.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A control system for maximizing the power supplied to a load of variable impedance, comprising a first control element for varying one component of said impedance, a second control element for varying a second component of said impedance, means for producing a signal voltage which is a measure of said power, a control relay, a continuously operating control device operable in one direction to effect operation of one of said elements in a direction to effect an increase in one of said components and operable in the other direction to effect operation of said one element to effect a decrease in said one component, a source of voltage, an electric valve provided with a control grid and having an anode connected to one side of said source and a cathode connected to the opposite side, a connection from said signal voltage producing means to said control grid, a capacitor included in said connection, a second electric valve having its anode connected to the cathode of said first valve and having its cathode connected to said grid, an auxiliary voltage source in the anode connection of said second valve for rendering the anode of said second valve negative with respect to the cathode of said first valve, said capacitor and said second valve rendering said first valve responsive to a reversal of the direction of change of said signal voltage irrespective of its magnitude to effect operation of said relay to a first position when said signal voltage is increasing and to a second position when said signal voltage is decreasing, and means responsive only to operation of said relay to said second position for reversing the direction of operation of said continuously operating control device.

2. A control system for maximizing the power supplied to a load of variable impedance, comprising a first element for varying a first component of said impedance, a second element for varying a second component of said impedance, means for producing a signal voltage which is a measure of said power, a reversible continuously operating control device operable in one direction to effect operation of said first element to effect an increase in said first component and operable in the reverse direction to effect operation of said first element to effect a decrease in said first component, an electric valve provided with an anode, a cathode and a control grid, a control relay operable to first and second operating positions and having its operating coil connected in the anode cathode circuit of said valve, a connection from said signal voltage producing means to said grid to render said valve responsive to said signal voltage for effecting operation of said relay from one of said operating positions to the other, means for rendering said electric valve responsive to the beginning of a decrease in said signal voltage irrespective of its magnitude for effecting operation of said relay to said first position comprising a capacitor connected in series in said grid connection, a second electric valve having a cathode connected to said grid and an anode having a connection to the cathode of said first valve, a source of voltage included in said last mentioned connection for rendering the voltage of the anode of said second valve negative with respect to the cathode voltage of said first valve, and means responsive to said relay only in said first position for reversing the direction of operation of said continuously operating control device.

3. A control system for maximizing the power supplied to a load of variable impedance, comprising a first element for varying one component of said impedance, a second element for varying a second component of said impedance, a voltage drop resistor, an electric valve provided with an output circuit including said resistor and with an input circuit, means responsive to said power for supplying a control voltage to said input circuit to cause said valve to produce across said resistor a signal voltage which is a measure of said power, a reversible continuously operating control device operable in one direction to effect operation of the first of said elements to effect an increase of one of said components and operable in the reverse direction to effect operation of said first element to effect a decrease of said one component, a control relay having first and second operating positions, a control electric valve provided with an anode, a cathode and a control grid, connections from said control grid and cathode to said resistor for rendering said control valve responsive to said signal voltage for effecting operation of said relay from one of said operating positions to the others, means for rendering said control valve responsive to the beginning of a decrease in said signal voltage irrespective of its magnitude for effecting operation of said relay to said first position comprising a capacitor connected in series in said grid connection, a diode electric valve having a cathode connected to said grid and an anode having a connection to the cathode of said first control valve and a source of voltage included in said last mentioned connection for rendering the voltage of the anode of said second valve negative with respect to the cathode voltage of said first control valve, and means responsive to said relay only in said first position for reversing the direction of operation of said continuously operating control device.

4. A control system for maximizing the power supplied to a load of variable impedance, comprising a first element for varying one component of said impedance, a second element for varying a second component of said impedance, means for producing a signal voltage which is a measure of said power, a control relay having first and second operating positions, a control device operable in one direction to effect operation of said first element in a direction to effect an increase in said first component and operable in the reverse direction to effect operation of said first element in a direction to effect a decrease in said first component, electric valve apparatus responsive to the signal voltage corresponding to an increase in said power for effecting operation of said relay to said first operating position and responsive to the signal voltage corresponding to a decrease in power for effecting operation of said relay to said second operating position, means responsive to operation of said relay to said second operating position for reversing the operation of said control device and means responsive to a predetermined number of operations of said relay for transferring control by said control device from the active one of said elements to the inactive element.

5. A control system for maximizing the power supplied to a load of variable impedance comprising a voltage drop resistor, an electric valve amplifier for producing across said resistor a signal voltage which is a measure of the magnitude of said power, a first driven element for varying a first component of said impedance, a second driven element for varying the other of said components, a reversible electric motor operable in one direction to cause the first of said driven elements to effect an increase in the corresponding component and operable in the reverse direction to cause said first driven element to effect a decrease in said corresponding component, a control relay having first and second operating positions, electric valve apparatus responsive to the signal voltage corresponding to an increase in said power for effecting an operation of said relay to said first operating position and responsive to the signal voltage corresponding to a decrease in said power for effecting operation of said relay to said second operating position, means responsive only to said operation of said relay to said second operating position for reversing the operation of said motor, and a switching device responsive to a predetermined number of operations of said relay for transferring the driving connection of said motor from said first driven element to the other.

JAMES DYSON.

No references cited.